Figure 1:
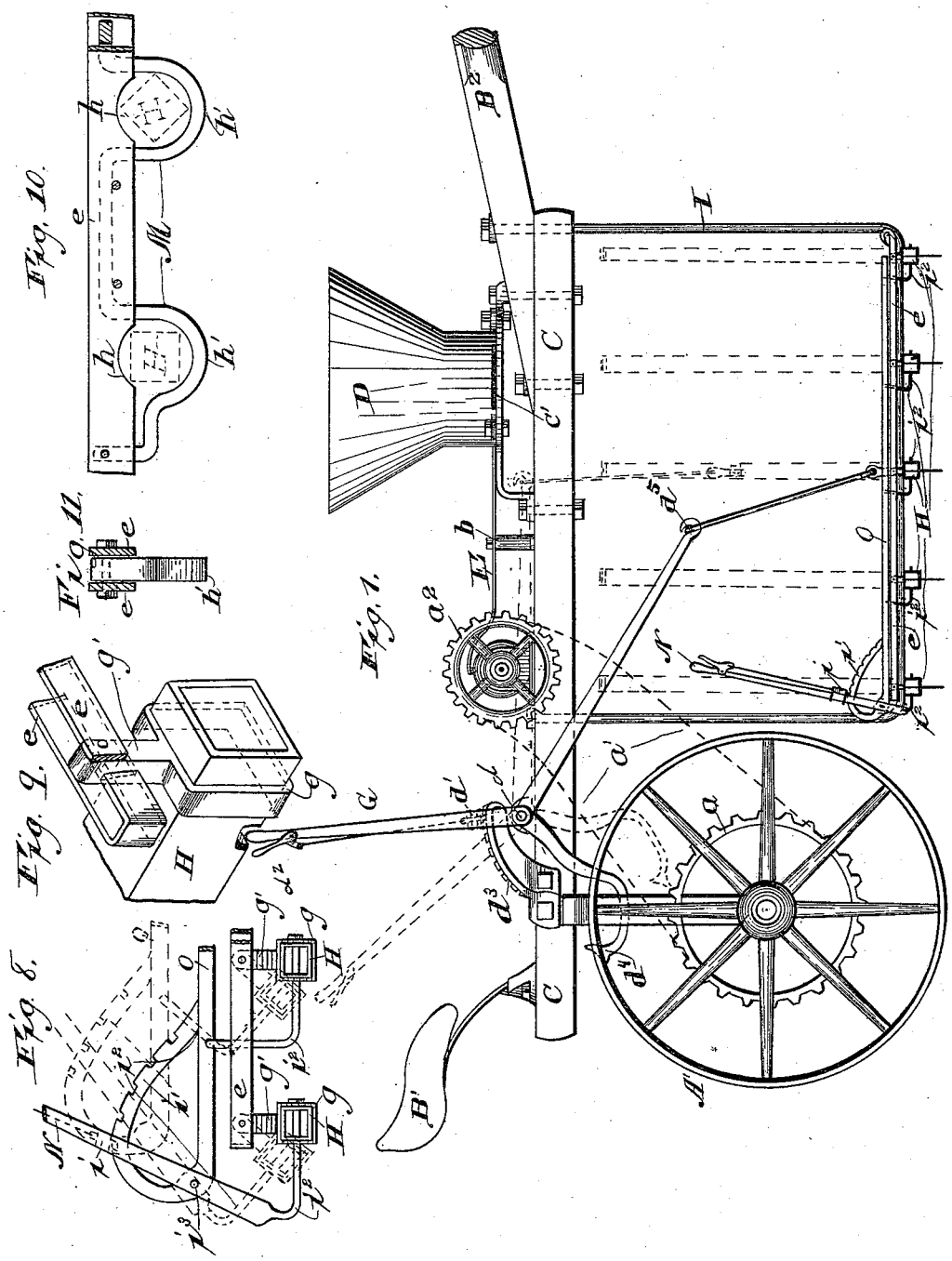

(No Model.) 3 Sheets—Sheet 1.

W. C. BURRELL.
COMBINED SEEDER AND HARROW.

No. 447,864. Patented Mar. 10, 1891.

Witnesses
Chas. E. Gorton
Dixie Doyle

Inventor
William C. Burrell
By his Attorney Chas. C. Tillman (No Model.) 3 Sheets—Sheet 2.

W. C. BURRELL.
COMBINED SEEDER AND HARROW.

No. 447,864. Patented Mar. 10, 1891.

Witnesses
Chas. E. Gorton
Dixie Doyle

Inventor
William C. Burrell
By his Attorney Chas. C. Tillman (No Model.) 3 Sheets—Sheet 3.
W. C. BURRELL.
COMBINED SEEDER AND HARROW.
No. 447,864. Patented Mar. 10, 1891.
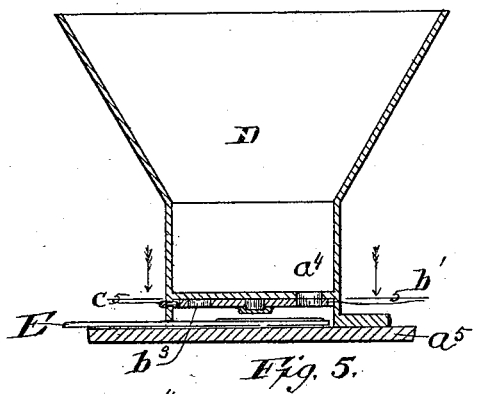
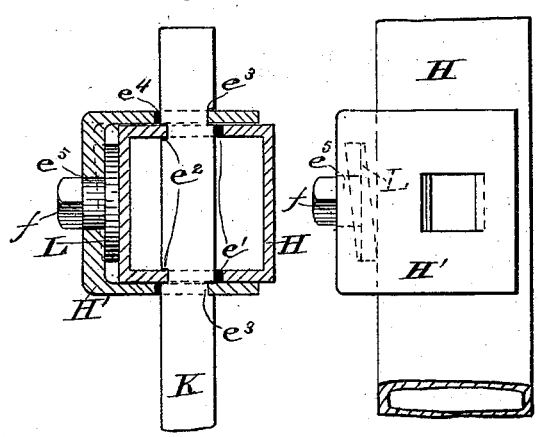
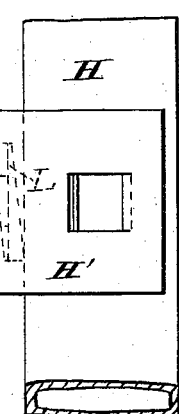
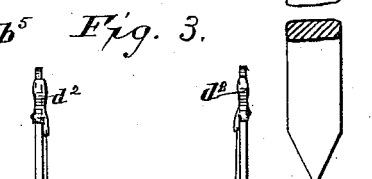
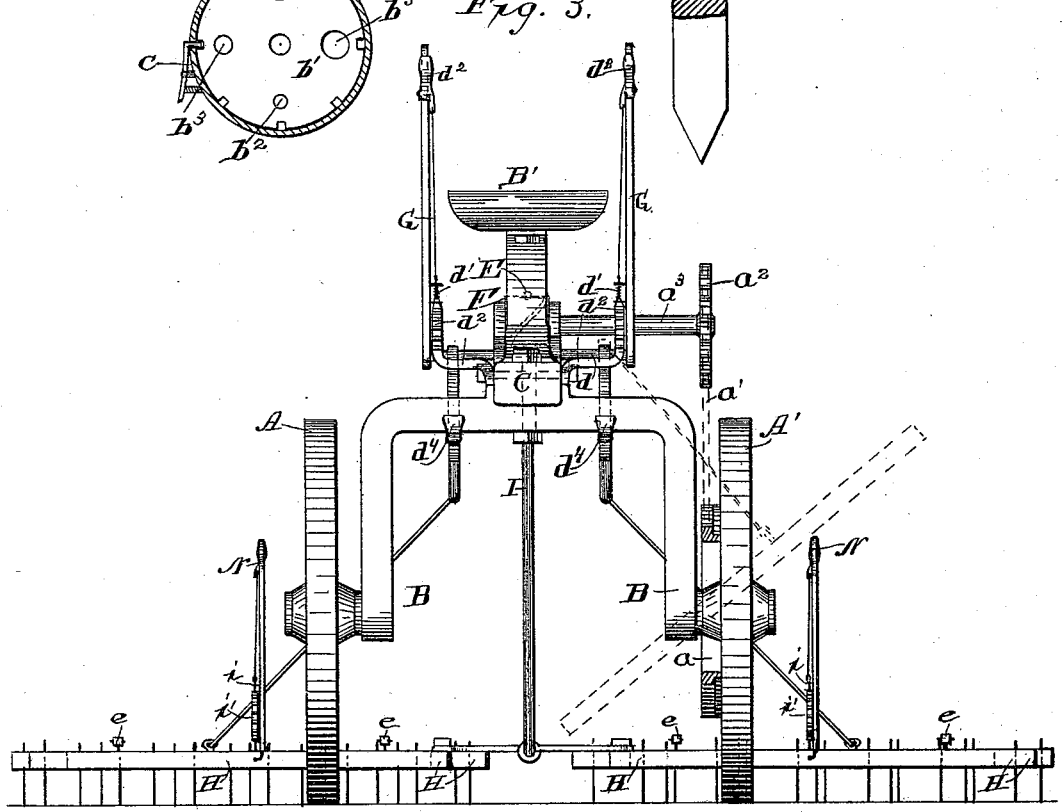
Witnesses
Chas. E. Gorton.
Dixie Doyle.
Inventor
William C. Burrell
By his Attorney Chas. C. Tillman

UNITED STATES PATENT OFFICE.

WILLIAM C. BURRELL, OF LA SALLE, ILLINOIS.

COMBINED SEEDER AND HARROW.

SPECIFICATION forming part of Letters Patent No. 447,864, dated March 10, 1891.

Application filed September 1, 1890. Serial No. 363,704. (No model.)

*To all whom it may concern:*

Be it known that I, WILLIAM C. BURRELL, a citizen of the United States, residing at La Salle, in the county of La Salle and State of Illinois, have invented certain new and useful Improvements in a Combined Seeder and Harrow and Harrow-Carrier, of which the following is a specification.

My invention relates to improvements in that class of agricultural machines used in preparing the earth for the reception of grain and in planting the same and commonly known as "seeders and harrows;" and it consists in certain peculiarities of the construction of the various parts and in the novel arrangement, operation, and combination thereof, as will be hereinafter more fully set forth and specifically claimed.

The objects of my invention are, first, to provide a machine for planting grain which shall be strong, durable, and effective in its work, yet simple in its construction and operation and quite inexpensive; second, a machine which shall automatically sow the seed broadcast and simultaneously (when desired) cover or "harrow" them in; third, a machine which can be used for harrowing the ground and sowing the seed at the same time, or in which either operation may be performed separately, and, fourth, a machine upon which the person operating it may ride and can at pleasure raise the harrow from the ground with but little effort and convey it speedily upon its carriage from one field to another. I attain these results or objects by the employment of the peculiar mechanism and arrangement thereof illustrated in the drawings; and in order to enable others skilled in the art to which my invention pertains to make and use the same I will now proceed to describe it, referring to accompanying drawings, in which—

Figure 2:
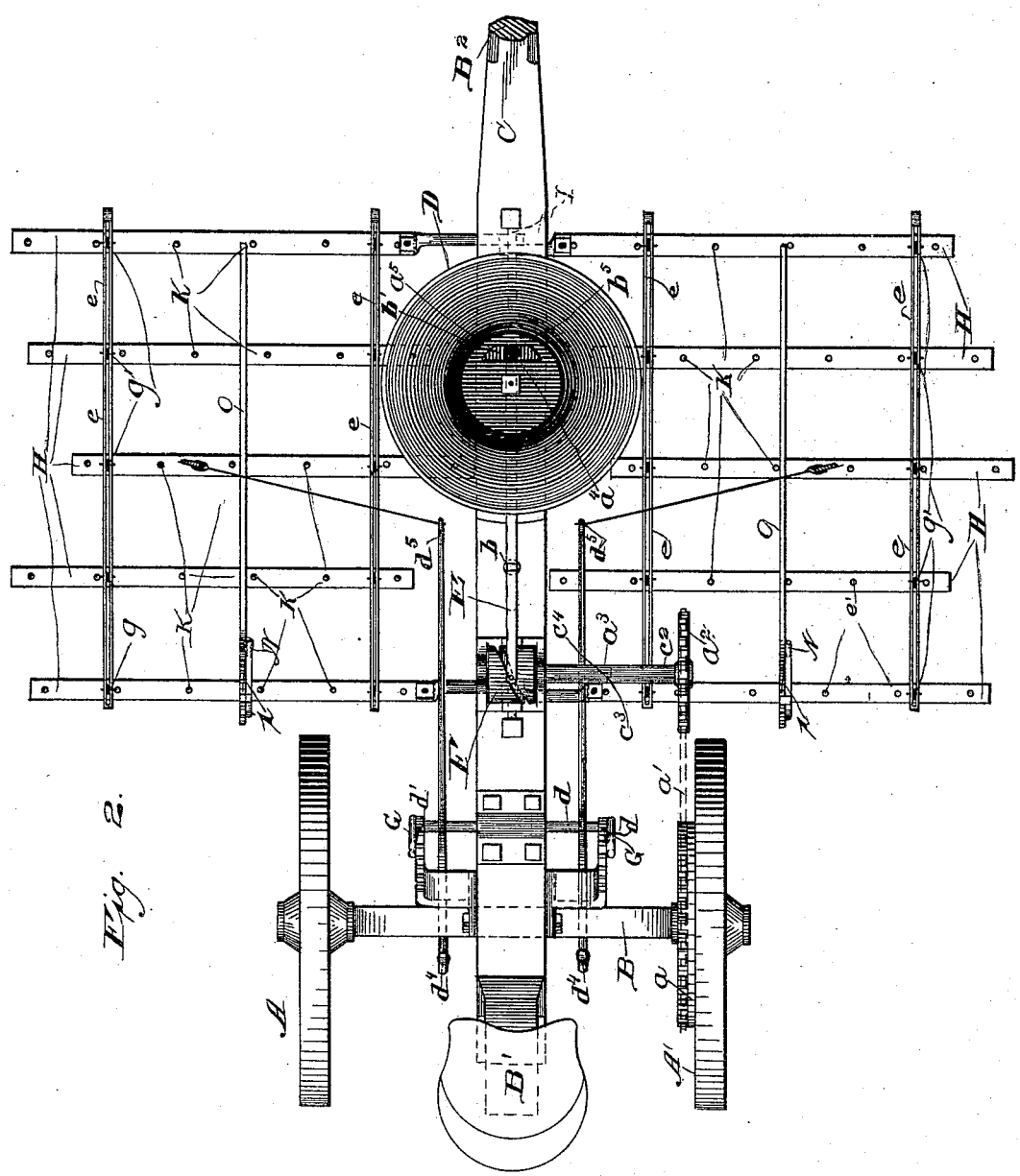

Figure 1 is a view in side elevation of my machine. Fig. 2 is a plan view thereof. Fig. 3 is a rear end view. Fig. 4 is a detail view of the grain receptacle or hopper. Fig. 5 is a detail plan view of a portion thereof. Fig. 6 is a portion of the harrow-frame, shown in section and illustrating the manner of securing the teeth therein. Fig. 7 is a plan view of the same. Fig. 8 is a detail side view of the teeth-regulating lever. Fig. 9 is a perspective view of a portion of the harrow-frame hinged to cross-bar. Fig. 10 is a similar view of a modification of Fig. 9, and Fig. 11 is an end view thereof.

Similar letters refer to corresponding parts throughout the different views of the drawings.

A A' represent the wheels of the carriage and are made of suitable size, material, and form, but usually in the style of ordinary vehicle-wheels, and are mounted on an axle B, which I prefer to form with an upward bend, as shown in Fig. 3, thereby attaining a support for other portions of the machine as well as axles for the wheels.

On the inner side of the wheel A' is provided a sprocket-wheel $a$, which engages through a chain belt $a'$ with a similar though smaller wheel $a^2$, which is journaled on a shaft $a^3$, which shaft is mounted and has its bearings on the beam C, which beam is firmly secured at its rear end to the upper portion of the axle B and aids in supporting the other parts of the device, as will be presently explained. To the rear upper portion of the beam C is secured a spring-seat B', upon which the driver may sit when using the machine.

At the front end of the beam C is attached in a suitable manner a pole or tongue $B^2$, to which the horses for drawing the machine are hitched and by which it is guided. Just back of the juncture of the tongue and beam and on the top of the latter is secured the hopper or grain-receptacle D, which is preferably made cylindrical in form and slightly sloping toward the bottom, thus clearing itself of the grain and allowing none to remain in or adhere to the sides of the vessel. The bottom of the hopper is provided with a hole $a^4$, through which the grain escapes to a plate $a^5$ below, from whence it is swept and evenly distributed over the ground by means of a laterally-acting lever or arm E, which is fulcrumed to the beam C, as at $b$, and engages at its rear end with a worm-grooved cam F, which is journaled on the shaft $a^3$ directly over the beam C, as seen in Fig. 2. Below the bottom of the hopper and above the free end of the lever E is movably secured a disk $b'$, which is provided with a number of openings $b^2$ $b^3$ $b^4$ $b^5$ of different sizes, which disk is adapted to regulate the quantity of seed permitted to fall on the plate $a^5$, for small seeds will require a smaller opening than the larger kinds, as is obvious. This disk may be turned to the desired position and there retained by means of a spring-actuated dog $c$, which is secured to the lower extremity of the hopper, which projects slightly beyond its bottom and rests on the plate $a^5$, and has on each side a horizontal slot $c'$, through which the seeds are thrown by the lateral action of the lever E. On the shaft $a^3$ is a sleeve $c^2$, which extends to near the middle of the shaft and is provided with a projection $c^3$ to fit a corresponding depression $c^4$ in the shaft. This enables me to throw the cam out of gear by shifting the wheel $a^2$ outward, which is rigidly secured to the sleeve. At a proper point to the rear of the cam and its bearings and on the beam C is journaled a shaft $d$, which projects slightly on either side of the beam and has at each of its ends a compound lever G, which are adapted to raise the harrow from the ground when it is desired to take any obstructions from the teeth or to remove the harrow from point to point without dragging, and is controlled by a pawl $d'$ and grip or pawl levers $d^2$, which pawls engage with suitable ratchets $d^3$, secured to the beam, as shown. Rigidly secured to the same shaft at each end thereof is a foot-rest $d^4$, upon which the driver while sitting on the seat may place his feet and by throwing his weight thereon will assist him in raising the harrow when it is desired.

The lower end of the lever G is suitably secured to the frame of the harrow near its center on each side of the beam, and is jointed, as shown at $d^5$ in Figs. 1 and 2.

The harrow-frame is composed of a number of bars H, which may be either of a hollow quadrilateral form or tubular, and are placed and retained by cross-bars $e$ transversely to the beam, the bars $e$ extending longitudinally with the beam. As shown in the drawings, this frame is divided into two parts, one on each side of the beam, which are hinged to a hanger I, which is bolted to the beam at its upper ends, as is clearly seen in Fig. 1. The bars H are provided at suitable points with openings $e'$ of suitable size and form for the reception and retention of the teeth K, which are usually quadrilateral in form and provided with depressions $e^2$ $e^3$ on opposite sides from each other and out of alignment. The depressions $e^2$ are adapted to engage with the sides of the opening $e'$ in the bar H and the depressions $e^3$ with the sides of the opening $e^4$ in the clamp H', which is formed in the shape of three sides of a quadrilateral, having one side open in order to allow it to be easily placed around the bar H. Opposite the open side of the clamp H' is formed a hole $e^5$, through which is passed the shank $f$ of a rotary wedge L, which is in the form of a disk or circular plate with a portion beveled or wedge shape, so that by turning the shank by means of a wrench the sides of the opening $e^4$ will be pressed into the depressions $e^3$ and firmly secure the tooth in place, as will be readily understood by reference to Figs. 6 and 7. It is obvious that I may dispense with the rotary wedge and opening $e^5$ in the clamp and use an ordinary wedge-shaped piece of metal, which would occupy the place of and perform the same function of the disk L. It is also apparent that I may use a tooth without the aforesaid depressions, in which case the tooth will be retained by clamping only. In Figs. 9 and 10 I have illustrated my method of hinging or hanging the bars H to the cross-bars $e$, so that they and the teeth may be placed at any desired angle when it is necessary to dislodge obstructions which may cling to the teeth.

In the construction shown in Fig. 9 I place a band $g$, having a shank $g'$, around the bar H and pivotally secure the shank to the bar $e$, as shown, and in Fig. 10, which is a modification of Fig. 9, which permits me to use either a tubular or square bar H, I form the cross-bars $e$ at the proper points for contact with the bars H, with an upward curve $h$, and secure between the two straps of the bars $e$, which are usually made so in each case, a hanger M, with downward curves $h'$, which, together with the curve $h$, complete a circle within which the bars H may revolve, be they either quadrilateral or tubular.

In Fig. 8 I have shown the manner of regulating the pitch of the teeth, which consists of a lever N, having a grip-actuated pawl $i$, which engages with a ratchet $i'$, which is formed on the end of the cross-bar O, which bar extends across each of the bars H near their middle and is connected thereto and supported thereby by means of a crooked rod $i^2$, which is rigidly secured to the lower end of the lever N below its fulcrum $i^3$ and is bolted to the bars H at its other end.

By throwing the lever forward the different parts of the harrow will assume the position shown by dotted lines in Fig. 8, when the teeth will be freed from obstructions in their progress.

Having thus fully described my invention, what I claim as new, and desire to secure by Letters Patent, is—

1. In a combined seeder and harrow and harrow-carrier, the combination of the teeth-holding bars H, having openings therein for the teeth, and the cross-bars $e$, pivotally securing the bars H together, the whole hinged to the hanger I, with the frame C, having the hanger I, the tongue $B^2$, seeder D, having its bottom provided with the opening $a^4$, the disk $b'$, having the openings $b^2$ $b^3$ $b^4$ $b^5$ and the spring-actuated dog $c$, the plate $a^5$, the lever E, secured to the frame C, the worm-cam F, the levers G, the spring-seat B', the axle B, supporting the frame C and having the wheels A A', and the wheel A', having the sprocket-wheel $a$, connected with the wheel $a^2$ by means of the belt $a'$, substantially as set forth.

2. In a combined seeder and harrow and harrow-carrier, the combination of the main frame C, having a seeder D, operated by the movement of the wheels of the carriage, with the carriage, the bars H, $e$, and O, secured together and divided into two parts and hinged on the hanger I, secured to the frame C, the bars H having the holes $e'$, the teeth K, having the niches $e^2$ $e^3$, the clamp H', having the holes $e^4$ and a wedge, the bands $g$, having the shanks $g'$, pivotally secured to the bars $e$, the levers G, foot-rests $d^4$, and the levers N, having the pawl $i$ and fulcrumed on the bar O and having the rods $i^2$, substantially as set forth.

3. In a combined seeder and harrow and harrow-carrier, the combination of the harrow-frame H, $e$, and O, secured together and divided into two parts and hinged on the hanger I, secured to a frame, the bars H having the holes $e'$, the teeth K, the clamps H, having holes $e^4$ and a wedge, and the bands $g$, having the shanks $g'$, pivotally secured to the bars $e$, with the hanger I, the seeder D, operated by the movement of the wheels of the carriage, the levers G, foot-rests $d^4$, and the levers N, fulcrumed on the bar O and having the rods $i^2$, substantially as set forth.

4. In a combined seeder and harrow and harrow-carrier, the combination of a main frame C, mounted on a carriage, with the carriage, the bars H, $e$, and O, secured together and forming the harrow-frame and divided into two parts, each part being hinged on a hanger I, secured to the main frame, the bars H having the holes $e'$, the teeth K, having the niches $e^2$ $e^3$, clamps H', having holes $e^4$ $e^5$, the rotary wedge L, having the shank $f$ and pivotally secured to the bars $e$, the seeder D, operated by means of the movement of the wheels of the carriage, the levers G, foot-levers $d^4$, and the levers N, having the pawls $i$, rods $i^2$, and fulcrumed on the bars O, substantially as set forth.

In witness whereof I have hereunto set my hand and affixed my seal this 29th day of August, A. D. 1890.

WILLIAM C. BURRELL. [L. S.]

In presence of—.
   EPHRAIM C. WESTWOOD,
   CHAS. E. GORTON.